United States Patent
Philipp et al.

(10) Patent No.: US 12,294,416 B2
(45) Date of Patent: May 6, 2025

(54) INTRA-AUTOMOBILE POWER AND COMMUNICATIONS VIA FIBER

(71) Applicant: GM GLOBAL TECHNOLOGY OPERATIONS LLC, Detroit, MI (US)

(72) Inventors: Tzvi Philipp, Bet Shemesh (IL); Igal Kotzer, Tel Aviv (IL)

(73) Assignee: GM Global Technology Operations LLC, Detroit, MI (US)

( * ) Notice: Subject to any disclaimer, the term of this patent is extended or adjusted under 35 U.S.C. 154(b) by 283 days.

(21) Appl. No.: 18/297,904

(22) Filed: Apr. 10, 2023

(65) Prior Publication Data
US 2024/0340093 A1    Oct. 10, 2024

(51) Int. Cl.
| | | |
|---|---|---|
| H04B 10/00 | (2013.01) | |
| H04B 10/079 | (2013.01) | |
| H04B 10/25 | (2013.01) | |
| H04B 10/80 | (2013.01) | |
| H04J 14/00 | (2006.01) | |

(52) U.S. Cl.
CPC ......... *H04B 10/807* (2013.01); *H04B 10/079* (2013.01); *H04B 10/25* (2013.01)

(58) Field of Classification Search
CPC ....... H04L 67/12; H04B 10/80; H04B 10/806; H04B 10/807
See application file for complete search history.

(56) References Cited

U.S. PATENT DOCUMENTS

| | | | | |
|---|---|---|---|---|
| 5,528,409 A | * | 6/1996 | Cucci | H04B 10/807 398/171 |
| 2021/0266244 A1 | * | 8/2021 | Haga | G06F 21/554 |

* cited by examiner

*Primary Examiner* — Daniel G Dobson
(74) *Attorney, Agent, or Firm* — Quinn IP Law (57) ABSTRACT

An automobile includes an electronic control unit (ECU), at least one fiber optical cable, and a sensor unit. The ECU is operational to generate an optical power signal and a first optical communications signal. The fiber optical cable transports the optical power signal and the first optical communications signal. The sensor unit is operational to convert the optical power signal into an electrical power, convert the first optical communications signal into an electrical control signal, measure a first parameter related to the automobile, and generate a second optical communications signal that conveys the first parameter as measured. The fiber optical transports the second optical communications signal to the electronic control unit. The ECU is further operational to convert the second optical communications signal into a first electrical sensed signal that conveys the first parameter, and take an action based on the first parameter in the first electrical sensed signal.

20 Claims, 7 Drawing Sheets

INTRA-AUTOMOBILE POWER AND COMMUNICATIONS VIA FIBER

The present disclosure relates to a system and a method for intra-automobile power and communications via fiber.

Wire-based power and communication systems in automobiles are currently implemented with wire harnesses. The wire harnesses occupy an appreciable amount of space within, and add a significant weight to the automobiles. In an absence of shielding, that adds more weigh and volume, signals on the wires are sensitive to radio-frequency interference and/or electro-magnetic interference.

Accordingly, those skilled in the art continue with research and development efforts in the field of intra-automobile power and communications.

SUMMARY

An automobile is provided herein. The automobile includes an electronic control unit, at least one fiber optical cable, and a sensor unit. The electronic control unit is operational to generate an optical power signal and a first optical communications signal. The at least one fiber optical cable is coupled to the electronic control unit and is operational to transport the optical power signal and the first optical communications signal. The sensor unit is located remote from the electronic control unit and is coupled to the at least one fiber optical cable. The sensor unit is operational to: convert the optical power signal into an electrical power; convert the first optical communications signal into an electrical control signal; measure a first parameter related to the automobile with a first sensor based on the electrical control signal and using the electrical power converted from the optical power signal; and generate a second optical communications signal that conveys the first parameter as measured. The at least one fiber optical is further operational to transport the second optical communications signal from the sensor unit to the electronic control unit. The electronic control unit is further operational to: convert the second optical communications signal into a first electrical sensed signal that conveys the first parameter as measured; and take an action based on the first parameter in the first electrical sensed signal.

In one or more embodiments of the automobile, the sensor unit includes: a first photovoltaic device operational to convert the optical power signal into the electrical power; a first optical receiver operational to convert the first optical communications signal into the electrical control signal; and a control circuit powered by the electrical power, coupled to the first sensor, and operational to receive the electrical control signal.

In one or more embodiments of the automobile, the first sensor is operational to generate a first detection signal by measuring the first parameter; the control circuit is further operational to generate an electrical modulated signal based on the first detection signal and the electrical control signal; and the sensor unit includes a remote optical transmitter coupled to the control circuit and operational to generate the second optical communications signal in response to the electrical modulated signal.

In one or more embodiments of the automobile, the sensor unit is further operational to: measure a second parameter related to the automobile with a second sensor based on the electrical control signal and using the electrical power converted from the optical power signal; and generate the second optical communications signal to convey the first parameter as measured and the second parameter as measured. The electronic control unit is further operational to convert the second optical communications signal into the first electrical sensed signal that conveys the first parameter as measured, and a second electrical sensed signal that conveys the second parameter as measured.

In one or more embodiments of the automobile, the electronic control unit includes a first optical multiplexer operational to multiplex the optical power signal and the first optical communications signal into a single channel of the at least one fiber optical cable. The sensor unit includes a first beam splitter operational to demultiplex the optical power signal and the first optical communications signal from the single channel of the at least one fiber optical cable.

In one or more embodiments of the automobile, the sensor unit includes a second optical multiplexer operational to multiplex the second optical communications signal into the single channel of the at least one fiber optical cable. The electronic control unit includes a second beam splitter operational to demultiplex the second optical communications signal from the single channel of the at least one fiber optical cable.

In one or more embodiments of the automobile, the electronic control unit includes: a drive circuit operational to generate a power drive signal and a data control signal; a first optical transmitter coupled to the drive circuit and operational to generate the optical power signal in response to the power drive signal; and a second optical transmitter coupled to the drive circuit and operational to generate the first optical communications signal in response to the data control signal.

In one or more embodiments of the automobile, the electronic control unit includes: a drive circuit operational to generate a modulation signal by multiplexing a power drive signal and a data control signal; and a single optical transmitter coupled to the drive circuit and operational to generate the optical power signal and the first optical communications signal in response to the modulation signal.

In one or more embodiments of the automobile, the at least one fiber optical cable is a multi-fiber cable having at least a first optical channel and a second optical channel. The first optical channel is operational to convey the optical power signal. The second optical channel is operational to convey the first optical communications signal and the second optical communications signal.

In one or more embodiments of the automobile, the at least one fiber optical cable includes a first fiber optical cable and a second fiber optical cable. The first fiber optical cable is separate from the second fiber optical cable. The first fiber optical cable is operational to convey the optical power signal. The second fiber optical cable is operational to convey the first optical communications signal and the second optical communications signal.

In one or more embodiments, the automobile further includes a first optical transmitter coupled to one end of the at least one fiber optical cable and operational to generate an optical carrier signal that conveys one of the electrical control signal and the first parameter. A reflective device coupled to an opposite end of the at least one fiber optical cable and operational to reflect the optical carrier signal to convey an opposite one of the electrical control signal and the first parameter.

A method for intra-automobile power and communications via fiber is provided herein. The method includes: generating an optical power signal in an electronic control unit of an automobile; generating a first optical communications signal in the electronic control unit; and transporting the optical power signal and the first optical communications signal in at least one fiber optical cable to a sensor unit of the automobile. The sensor unit is remote from the electronic control unit. The method includes: converting the optical power signal into an electrical power in the sensor unit; converting the first optical communications signal into an electrical control signal in the sensor unit; measuring a first parameter related to the automobile with a first sensor of the sensor unit based on the electrical control signal and using the electrical power converted from the optical power signal; generating a second optical communications signal in the sensor unit. The second optical communications signal conveys the first parameter as measured; transporting the second optical communications signal in the at least one fiber optical cable from the sensor unit to the electronic control unit; converting the second optical communications signal into a first electrical sensed signal in the electronic control unit. The first electrical sensed signal conveys the first parameter as measured; and taking an action in the electronic control unit based on the first parameter in the first electrical sensed signal.

In one or more embodiments, the method includes: converting the optical power signal into the electrical power with a first photovoltaic device; converting the first optical communications signal into the electrical control signal with a first optical receiver; and receiving the electrical control signal at a control circuit that is powered by the electrical power.

In one or more embodiments, the method includes: generating a first detection signal by measuring the first parameter with the first sensor; generating an electrical modulated signal based on the first detection signal and the electrical control signal; and generating the second optical communications signal in response to the electrical modulated signal.

In one or more embodiments, the method includes: measuring a second parameter related to the automobile with a second sensor based on the electrical control signal and using the electrical power converted from the optical power signal; generating the second optical communications signal to convey the first parameter as measured and the second parameter as measured; and converting the second optical communications signal into the first electrical sensed signal that conveys the first parameter as measured, and a second electrical sensed signal that conveys the second parameter as measured.

In one or more embodiments, the method includes: multiplexing optically in the electronic control unit the optical power signal and the first optical communications signal into a single channel of the at least one fiber optical cable; and demultiplexing optically in the sensor unit the optical power signal and the first optical communications signal from the single channel of the at least one fiber optical cable.

In one or more embodiments, the method includes: multiplexing optically in the sensor unit the second optical communications signal into the single channel of the at least one fiber optical cable; and demultiplexing optically in the electronic control unit the second optical communications signal from the single channel of the at least one fiber optical cable.

In one or more embodiments, the method includes: generating a modulation signal by multiplexing a power drive signal and a data control signal in the electronic control unit; and generating the optical power signal and the first optical communications signal in response to the modulation signal.

In one or more embodiments, the method includes transmitting the optical power signal before transmitting the first optical communications signal.

An automobile is provided herein. The automobile includes an electronic control unit, at least one fiber optical cable, and a sensor unit. The electronic control unit is operational to generate an optical power signal and a first optical communications signal. The at least one fiber optical cable is coupled to the electronic control unit and is operational to transport the optical power signal and the first optical communications signal. The sensor unit is remote from the electronic control unit, coupled to the at least one fiber optical cable, and has at least a first sensor and a second sensor. The sensor unit is operational to: convert the optical power signal into an electrical power; convert the first optical communications signal into an electrical control signal; measure a first parameter related to the automobile with the first sensor based on the electrical control signal and using the electrical power converted from the optical power signal; measure a second parameter related to the automobile with the second sensor based on the electrical control signal and using the electrical power converted from the optical power signal; and generate a second optical communications signal that conveys the first parameter as measured and the second parameter as measured. The at least one fiber optical is further operational to transport the second optical communications signal from the sensor unit to the electronic control unit. The electronic control unit is further operational to convert the second optical communications signal into a first electrical sensed signal that conveys the first parameter as measured and a second electrical sensed signal that conveys the second parameter in the first electrical sensed signal.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure generally provide a system and/or method that uses optical power transmitted over a fiber cable to generate electrical power at a sensor unit within an automobile. The electrical power is stored as energy in a capacitor and/or battery in the sensor unit. The electrical power runs circuitry, sensors, and optical communication devices of the sensor unit. The optical communication devices generally operate at a higher frequency than the optical power received via the fiber cable. The higher frequency is used to exchange commands and sensed data between the sensor unit and an electronic control unit. In various embodiments, a light source for the optical power may be located at a front end (e.g., a proximal side) of the automobile. From the light source, one or more fiber cables are distributed throughout the automobile to one or more distant locations. At each distal end of a fiber cable, the collected light is converted into the electrical power. The electrical power charges a storage device and powers a control circuit with sensor(s). The control circuits generally have a variety of functions, such as cameras, radar, ultrasound, temperature, pressure, and/or other sensor types found in and on an automobile. Each control circuit has a communication channel that is coupled to the same fiber cable used to receive the optical power and may communicate with the proximal side of the automobile.

Figure 1:
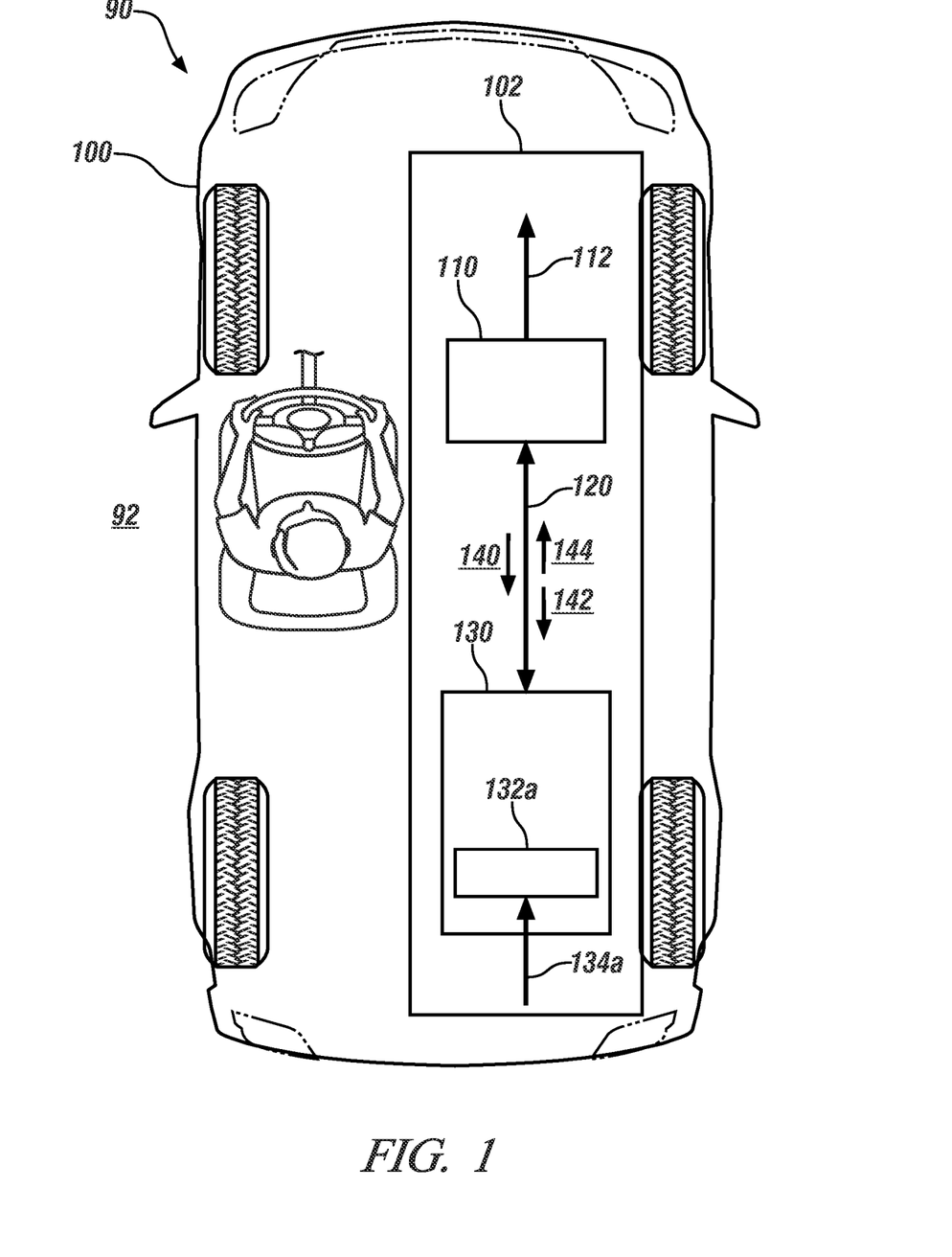
FIG. 1 is a schematic plan diagram of a context of an environment around an automobile in accordance with one or more exemplary embodiments.

Referring to FIG. 1, a schematic plan diagram of an example context of an environment 90 around an automobile 100 is shown in accordance with one or more exemplary embodiments. The automobile 100 resides on the ground 92 (e.g., a roadway) at a current location. The automobile 100 includes a system 102. The system 102 generally includes an electronic control unit 110, one or more fiber optical cables 120 (one shown), and one or more sensor units 130 (one shown). Each sensor unit 130 may include one or more first sensors 132a (one shown).

A first parameter 134a may be received by the first sensor 132a. The first parameter 134a is a measurable aspect of the automobile 100. An optical power signal 140 may be generated by the electronic control unit 110 and transferred to the sensor units 130. The optical power signal 140 generally conveys a bright light. A first optical communications signal 142 is presented from the electronic control unit 110 to the sensor units 130. The first optical communications signal 142 conveys control information that the electronic control unit 110 uses to inform the sensor unit 130. A second optical communications signal 144 is generated by the sensor unit 130 and presented to the electronic control unit 110. The second optical communications signal 144 may carry measured parameter data collected by the sensor unit 130 about the automobile 100. An action signal 112 is generated and presented by the electronic control unit 110. The action signal 112 carries instructions and/or data generated by the electronic control unit 110.

The automobile 100 implements a gas-powered automobile, an electric automobile, a hybrid automobile, or a plug-in hybrid automobile. In various embodiments, the automobile 100 may include, but is not limited to, a passenger automobile, a truck, and/or an autonomous automobile. Other types of ground-based automobiles may be implemented to meet the design criteria of a particular application.

The electronic control unit 110 implements a computer and/or dedicated hardware circuitry. The electronic control unit 110 is operational to transmit the optical power signal 140 and the first optical communications signal 142 to the sensor unit 130 via the fiber optical cable 120. The electronic control unit 110 is also operational to receive the second optical communications signal 144 through the fiber optical cable 120. The second optical communications signal 144 may be converted internally into a first electrical sensed signal that conveys the first parameter as measured. The electronic control unit 110 may also be operational to take an action (e.g., present the action signal 112) based on the first parameter as measured.

The electronic control unit 110 generally includes one or more microcontrollers. Each microcontroller may include one or more processors. Each processor may be embodied as an individual processor, an application specific integrated circuit (ASIC), a field programmable gate array (FPGA), or a dedicated electronic control unit. The microcontrollers may be an electronic processor (implemented in hardware, software executing on hardware, or a combination of both). The microcontrollers may also include tangible, non-transitory memory (e.g., read-only memory in the form of optical, magnetic, and/or flash memory). For example, the microcontrollers may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be recorded (or stored) in the memory and executed as set forth herein. The executed instructions may be a series of instructions employed to run applications on the microcontrollers (either in the foreground or background). The microcontrollers may receive commands and information, in the form of one or more input signals from various controls or components in the automobile 100 and communicate instructions to the other electronic components.

The fiber optical cable 120 implements one or more optical fibers 122 (one shown). In various embodiments, the optical fibers 122 may be single mode fiber. In other embodiments, the optical fibers 122 may be multi-mode fibers. Due to the short distances between the sensor unit 130 and the electronic control unit 110 within the automobile 100 (e.g., 5 to 10 meters), the use of the multi-mode optical fiber is advantageous from a cost and assembly perspective. Single mode and polarization maintaining optical fibers may also be implemented as the optical fiber 122 in the fiber optical cable 120. In various embodiments, the optical power signal 140 and the first optical communications signal 142 may be separated by wavelength-division multiplexing (WDM). The wavelength-division multiplexing transmits multiple channels of information (power and data) through a single optical fiber by sending multiple light beams of different wavelengths through the fiber, each modulated with a separate information channel.

The sensor unit 130 implements a microcontroller and one or more first sensors 132a. The sensor unit 130a is operational to measure a first parameter 134a of the automobile 100 using the first sensor 132a. Data for the measured first parameters 134a is converted to the second optical communications signal 144 and transmitted back to the electronic control unit 110. The first parameters 134a may include, but are not limited to, temperature, pressure, ambient light, open door, seat occupancy, and the like. The sensor unit 130 may be powered solely by the optical power signal 140.

Figure 2:
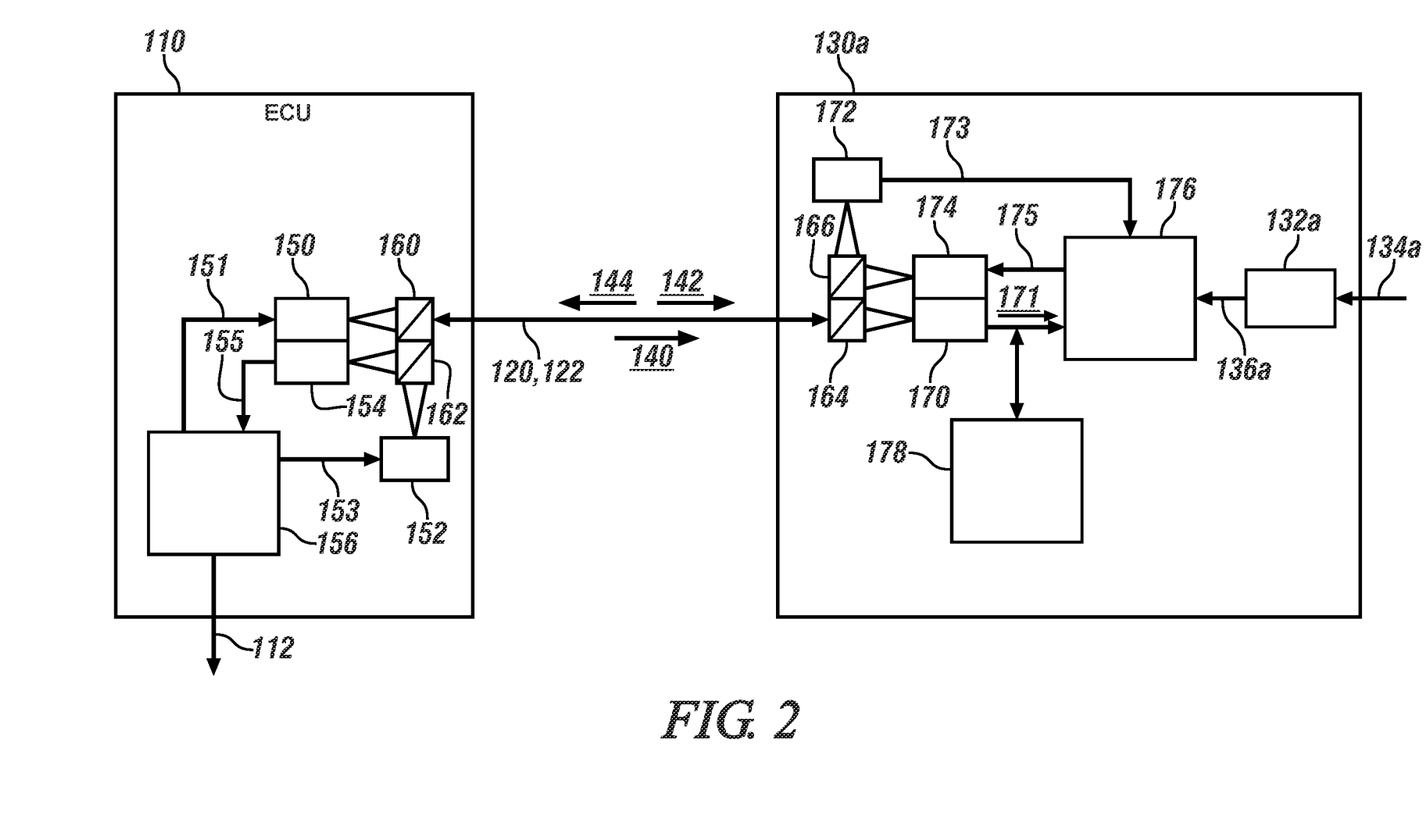
FIG. 2 is a schematic diagram of an electronic control unit and a sensor unit in accordance with one or more exemplary embodiments

Referring to FIG. 2, a schematic diagram of an example implementation of an electronic control unit 110 and a sensor unit 130*a* is shown in accordance with one or more exemplary embodiments. The sensor unit 130*a* may be a variation of the sensor unit 130 (FIG. 1). The electronic control unit 110 generally includes a first optical transmitter 150 (TX), a second optical transmitter 152 (TX), a second optical receiver 154 (RX), a drive circuit 156, a first optical multiplexer 160, and a second beam splitter 162. The sensor unit 130*a* may include a second optical multiplexer 164, a first beam splitter 166, a first photovoltaic device 170 (PV), a first optical receiver 172 (RX), a remote optical transmitter 174 (TX), a control circuit 176, and an energy storage device 178.

The first optical transmitter 150 implements a light source (e.g., a light-emitting diode, a laser, or a lamp) that generates the first optical transmitter 150 in response to a power drive signal 151. The first optical transmitter 150 is in communication with the electronic control unit 110 to receive controls regarding the generation of the optical power signal 140. The optical power signal 140 emitted from the first optical transmitter 150 is coupled into the fiber optical cable 120 through the first optical multiplexer 160. In various embodiments, the first optical transmitter 150 emits the light of the optical power signal 140 in the near infrared region from approximately 800 nanometers (nm) to approximately 1200 nm (e.g., 850 nm for peak efficiency of a silicon photo detector). The optical power signal 140 may convey approximately 1 milliwatts (mW) to approximately 10 watts (W), depending on the power criteria of the sensor unit 130. An upper power limit of the optical power signal 140 may be limited by the power density supported by the first photovoltaic device 170.

The second optical transmitter 152 implements a light source (e.g., a light-emitting diode or a laser) that generates the first optical communications signal 142 in response to a data control signal 153. The second optical transmitter 152 is in communication with the drive circuit 156 to control modulation of the first optical communications signal 142. The modulation of the first optical communications signal 142 generally conveys control information and data used by the sensor unit 130*a*. The first optical communications signal 142 is coupled into the fiber optical cable 120 through the second beam splitter 162 and the first optical multiplexer 160.

The second optical receiver 154 implements a light-sensitive receiver. The second optical receiver 154 is in communication with the drive circuit 156. The second optical receiver 154 is operational to convert the second optical communications signal 144 into a first electrical sensed signal 155. The first electrical sensed signal 155 generally conveys the first parameter 134*a* measured by the sensor unit 130*a*. The second optical communications signal 144 is transferred from the fiber optical cable 120 via the first optical multiplexer 160 and the second beam splitter 162.

The drive circuit 156 implements a communications control circuit. The drive circuit 156 is operational to control the first optical transmitter 150 to generate the optical power signal 140, control the second optical transmitter 152 to generate the first optical communications signal 142, receive the first electric sensed signal with the first parameter from the second optical receiver 154, and take action (e.g., generate the action signal 112) based on the first parameter as measured.

In various embodiments, the drive circuit 156 is operational to electrically drive the first optical transmitter 150 via a drive current in the power drive signal 151 supplied by a current source. The drive current is a function of time, that may take the form of a square wave, sin wave, or other waveform. Elevating the driver current, above the light source threshold acts to trigger the first optical transmitter 150 to emit a specified amount of optical power.

The first optical multiplexer 160 implements a beam splitter and optical coupler. The first optical multiplexer 160 couples the first optical transmitter 150 and the second beam splitter 162 to the optical fiber 122 in the fiber optical cable 120 using lenses and a flat surface.

The second beam splitter 162 implements another beam splitter. The second beam splitter 162 couples the second optical transmitter 152 and the second optical receiver 154 to the fiber optical cable 120 via the first optical multiplexer 160. The coupling may include, but not limited to, a lens, a flat surface and/or chip-to-fiber coupling, also known as butt coupling.

The second optical multiplexer 164 implements a beam splitter and optical coupler. The second optical multiplexer 164 couples the first photovoltaic device 170 and the first beam splitter 166 to the optical fiber 122 in the fiber optical cable 120 with lenses and a flat surface.

The first beam splitter 166 implements another beam splitter. The first beam splitter 166 couples the remote optical transmitter 174 and the first optical receiver 172 to the fiber optical cable 120 via the second optical multiplexer 164. The coupling may be lenses, a flat surface and/or chip-to-fiber coupling.

The first photovoltaic device 170 implements an opto-electrical receiver. The first photovoltaic device 170 is coupled to the control circuit 176 and the energy storage device 178. The first photovoltaic device 170 is operational to convert the optical power signal 140 into an electrical power 171. The optical power signal 140 creates a detected current that flows in proportion to the incident light. The electrical power 171 may be stored in the energy storage device 178 and powers the control circuit 176 and the first sensor 132*a*. In various embodiments, the first photovoltaic device 170 may be fabricated in silicon. In other embodiments, other materials may be used such as Gallium Arsenide (GaAs), Indium Arsenide (InAs) and/or Indium Gallium Arsenide (InGaAs), depending upon the wavelength of the optical power signal 140. The first photovoltaic device 170 is coupled to the second optical multiplexer 164 by a lens or chip-to-fiber coupling.

The first optical receiver 172 implements a light-sensitive receiver. The first optical receiver 172 is in communication with the control circuit 176. The first optical receiver 172 is operational to convert the first optical communications signal 142 into an electrical control signal 173. The electrical control signal 173 conveys the control information and data transmitted by the electronic control unit 110 via the fiber optical cable 120. The control information may include details about what parameters to measure, when to measure, how often to measure, when to transmit back to the electronic control unit 110, and the like. The first optical receiver 172 is coupled to the first beam splitter 166 by a lens or chip-to-fiber coupling. The first optical communications signal 142 is transferred from the fiber optical cable 120 to the first optical receiver 172 via the second optical multiplexer 164 and the first beam splitter 166.

The remote optical transmitter 174 implements a light source (e.g., a light-emitting diode or a laser) that generates the second optical communications signal 144 based on an electrical modulated signal 175. The remote optical transmitter 174 is in communication with the control circuit 176 to control modulation of the second optical communications signal 144. The modulation of the second optical communications signal 144 generally conveys the first parameter 134a related to the automobile 100 as measured by the first sensor 132a. The second optical communications signal 144 is coupled into the fiber optical cable 120 through the first beam splitter 166 and the second optical multiplexer 164.

The control circuit 176 implements a communications and sensing control circuit. The control circuit 176 is operational to control the remote optical transmitter 174 to generate the second optical communications signal 144, receive the electrical control signal 173 from the first optical receiver 172, receive the first parameter 134a via a first sensed parameter signal 136a from the first sensor 132a.

The energy storage device 178 implements a battery and/or a capacitor. While sufficiently charged, the stored energy in the energy storage device 178 is used to operate the communication channels for the sensor unit 130a. In addition, the energy storage device 178 may power the first sensor 132a and the control circuit 176.

The first optical communications signal 142 may be generated at a lower optical power (e.g., approximately 5 mW to approximately 10 mW) than the optical power signal 140. The lower-power first optical communications signal 142 is modulated at a communication frequency of a few hundreds of kilohertz (Khz), several megahertz (Mhz), an in various application, a few gigahertz (Ghz). In some cases, the first optical communications signal 142 may operate at a different wavelength than the optical power signal 140. Likewise, the second optical communications signal 144 may operate at a different wavelength than the optical power signal 140. In some designs, the first optical communications signal 142 and the second optical communications signal 144 may operate on the same wavelength or at different wavelengths.

Figure 3:
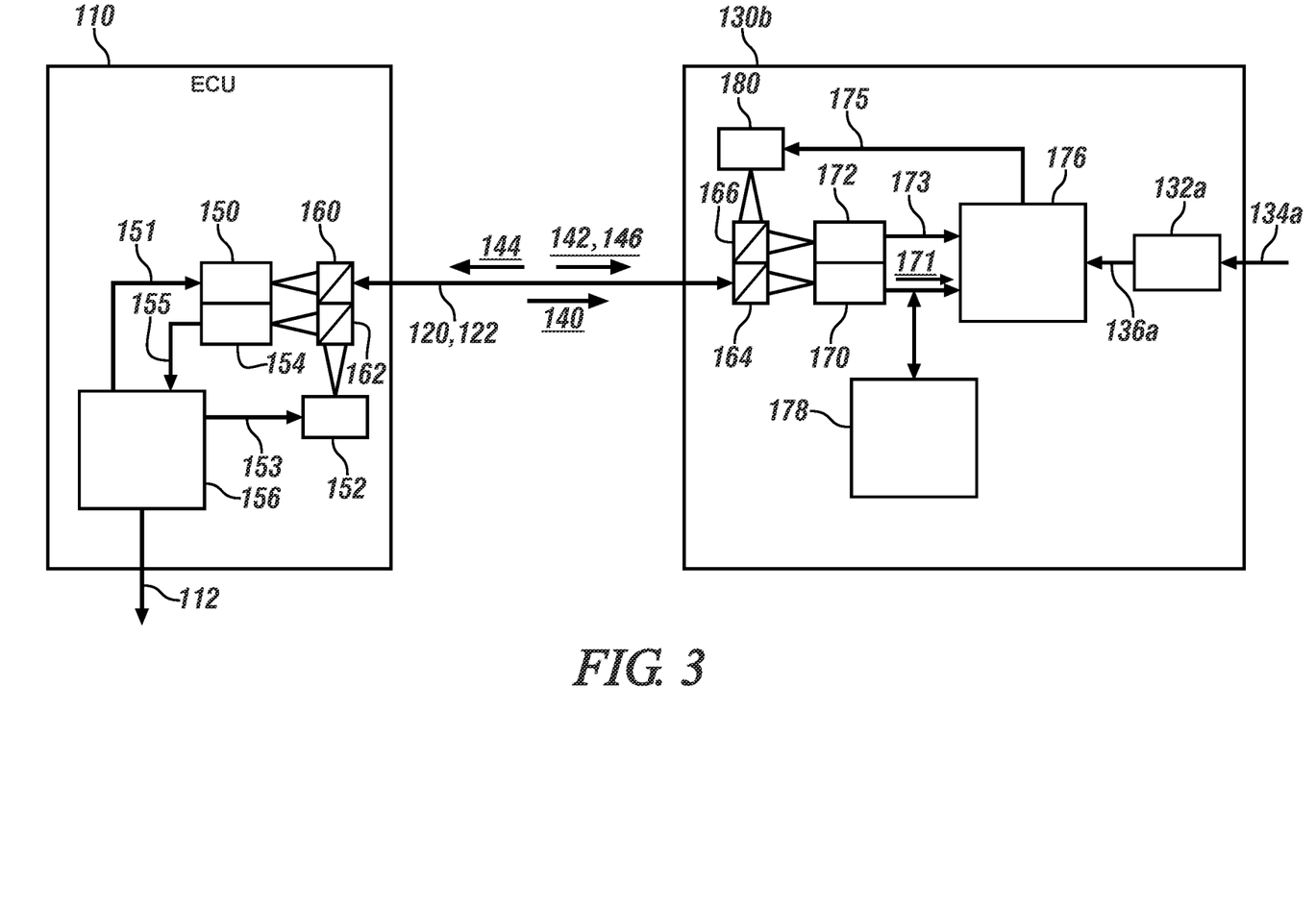
FIG. 3 is a schematic diagram of the electronic control unit and another sensor unit in accordance with one or more exemplary embodiments.

Referring to FIG. 3, a schematic diagram of an example implementation of an electronic control unit 110 and a sensor unit 130b is shown in accordance with one or more exemplary embodiments. The sensor unit 130b may be a variation of the sensor unit 130 (FIG. 1) and or 130a. The sensor unit 130b may include the second optical multiplexer 164, the first beam splitter 166, the first photovoltaic device (PV) 170, the first optical receiver (RX) 172, the remote optical transmitter (TX) 174, a reflective device 180 (REF), a control circuit 176, and an energy storage device 178.

The reflective device 180 implements an electronically controlled reflective device. The reflective device 180 is operational to produce the second optical communications signal 144 by selectively returning/not returning an optical carrier signal 146 back to the electronic control unit 110. While the electronic control unit 110 is sending commands and data to the sensor unit 130b via the optical carrier signal 146, the sensor unit 130b may not present the second optical communications signal 144. While the electronic control unit 110 is not sending the commands and data, the electronic control unit 110 may generate the optical carrier signal 146 in a regular pattern (e.g., a steady state, a square wave, or the like). The reflective device 180 may be modulated by the electrical modulated signal 175 to reflect or not reflect back the optical carrier signal 146 directly back into the first beam splitter 166 and thus through the fiber optical cable 120 to the electronic control unit 110. By modulating the reflections of the optical carrier signal 146, the sensor unit 130b generates the second optical communications signal 144 that conveys the first parameter 134a.

Figures 4, 5:
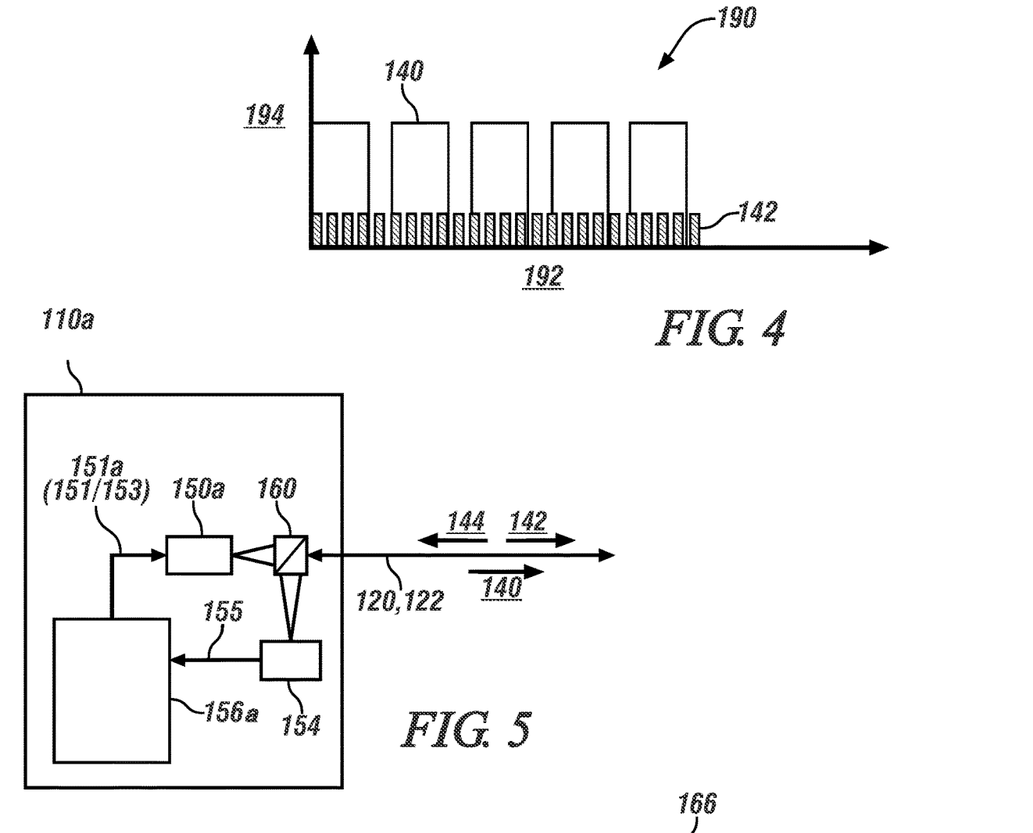
FIG. 4 is a graph for a first multiplexing of an optical power signal and a first optical communications signal in accordance with one or more exemplary embodiments.
FIG. 5 is a schematic diagram of another electronic control unit in accordance with one or more exemplary embodiments.

Referring to FIG. 4 and FIG. 2, a graph 190 of a first example multiplexing of an optical power signal and a first optical communications signal is shown in accordance with one or more exemplary embodiments. The graph 190 may have an x-axis 192 and a y-axis 194. The x-axis 192 illustrates time. The y-axis 194 illustrates a drive current provided in the power drive signal 151 to the first optical transmitter 150.

An intensity of the optical power signal 140 is controlled by the power drive signal 151. The power drive signal 151 may be modulated as a function of an efficiency of the first optical transmitter 150, power consumption of the control circuit 176, power consumption of the first sensor 132a, and/or charging characteristics of the energy storage device 178. In various embodiments, the power drive signal 151 and the resulting optical power signal 140 may be square waves with a variable duty cycle to adjust the average power delivered by the optical power signal 140. In other embodiments, amplitudes of the power drive signal 151 and the optical power signal 140 may be variable to adjust the average power delivered by the optical power signal 140.

An intensity of the first optical communications signal 142 is controlled by the data control signal 153. The data control signal 153 may be modulated such that the first optical communications signal 142 has a higher frequency and a lower peak value than the optical power signal 140.

Referring to FIG. 5 a schematic diagram for an example implementation of an electronic control unit 110a is shown in accordance with one or more exemplary embodiments. The electronic control unit 110a may be a variation of the electronic control unit 110 (FIG. 2). The electronic control unit 110a generally includes the first optical transmitter 150 (also referred to as a single optical transmitter 150a), the second optical receiver 154, a drive circuit 156a, and the first optical multiplexer 160 coupled to the fiber optical cable 120. The drive circuit 156a may be a variation of the drive circuit 156.

The drive circuit 156a is operational to multiplex the data control signal 153 onto the power drive signal 151 to create a modulation signal 151a. Therefore, the single optical transmitter 150a may generate the optical power signal 140 and the first optical communications signal 142 contemporaneously.

Figures 6, 7:
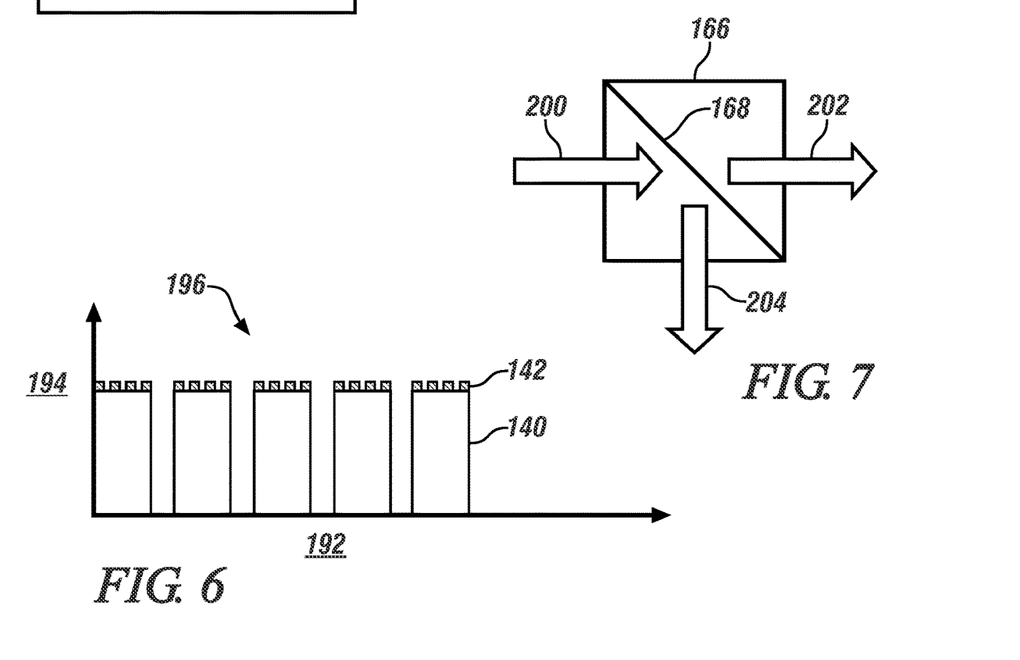
FIG. 6 is a graph for a second multiplexing of the optical power signal and the first optical communications signal in accordance with one or more exemplary embodiments.
FIG. 7 is a schematic diagram of a representative beam splitter in accordance with one or more exemplary embodiments.

Referring to FIG. 6 and FIG. 5, a graph 196 for a second example multiplexing of an optical power signal and a first optical communications signal is shown in accordance with one or more exemplary embodiments. The graph 196 may have the x-axis 192 and the y-axis 194. The x-axis 192 illustrates time. The y-axis 194 illustrates a drive current/ electrical control current provided in the modulation signal 151a to the single optical transmitter 150a.

An intensity of the optical power signal 140 is controlled by the power drive signal 151 with the data control signal 153 superimposed thereon. The modulation signal 151a may be a function of an efficiency of the first optical transmitter 150, power consumption of the control circuit 176, power consumption of the first sensor 132a, and/or charging characteristics of the energy storage device 178 to produce an appropriate optical power signal 140. The modulation signal 151a may also be modulated as a function of the data control signal 153 to produce the first optical communications signal 142 from the single optical transmitter 150a. A depth of the modulation for the first optical communication signal 142 is generally sufficient for the sensor unit 130a to distinguish between a digital "on" state and a digital "off" state. Depending upon the frequency (e.g., bandwidth) and detector sensitivity, a modulation depth of approximately 5% to approximately 10% of the peak amplitude of the optical power signal 140 may be sufficient.

Referring to FIG. 7, a schematic diagram of an example implementation of a representative beam splitter 166 is shown in accordance with one or more exemplary embodiments. One or more of the first optical multiplexer 160, the second optical multiplexer 164, the first beam splitter 166 and/or the second beam splitter 162 may be represented by the representative beam splitter 166. The representative beam splitter 166 includes partially reflective mirrored surface 168 that is operational to optically parse an input optical signal 200 into two optical output signals 202 and 204.

The input optical signal 200 may be received by the representative beam splitter 166. In various embodiments, the input optical signal 200 may represent the optical power signal 140, the first optical communication signal 142, and/or the second optical communications signal 144.

The first optical output signal 202 may be presented from the representative beam splitter 166. The first optical output signal 202 may be a transmitted signal having an intensity proportional to the input optical signal 200. In various embodiments, the first optical output signal 202 may represent the optical power signal 140, the first optical communication signal 142, and/or the second optical communications signal 144.

The second optical output signal 204 may be presented from the representative beam splitter 166. The second optical output signal 204 may be a reflected signal having an intensity proportional to the input optical signal 200. In various embodiments, the second optical output signal 204 may represent the optical power signal 140, the first optical communication signal 142, and/or the second optical communications signal 144.

In various embodiments, the representative beam splitter 166 may be operational to optically combine two incident optical signals into a single output optical signal. For example, the representative beam splitter 166 may receive the optical power signal 140 through one incident surface and the first optical communications signal 142 through another incident surface. A combined optical power signal 140 and first optical communications signal 142 may be presented through an exit surface of the representative beam splitter 166.

At the sensor unit 130 side of the fiber optical cable 120, the representative beam splitter 166 divides the incoming light pulses between the first photovoltaic device 170 (for the optical power signal 140) and the first optical receiver 172 (for the first optical communications signal 142). Since a majority of the optical power signal 140 may be transferred to the first photovoltaic device 170, the representative beam splitter 166 may have an approximately 90% to 10% ratio favoring the first photovoltaic device 170. Other ratios that suits the characteristics of the first photovoltaic device 170 and the first optical receiver 172 may be implemented to meet a design criteria of a particular application. The representative beam splitter 166 may include coatings, polarization effects, "dot" coatings, and the like. The representative beam splitter 166 may have a cube shape or a plate shape.

Figure 8:
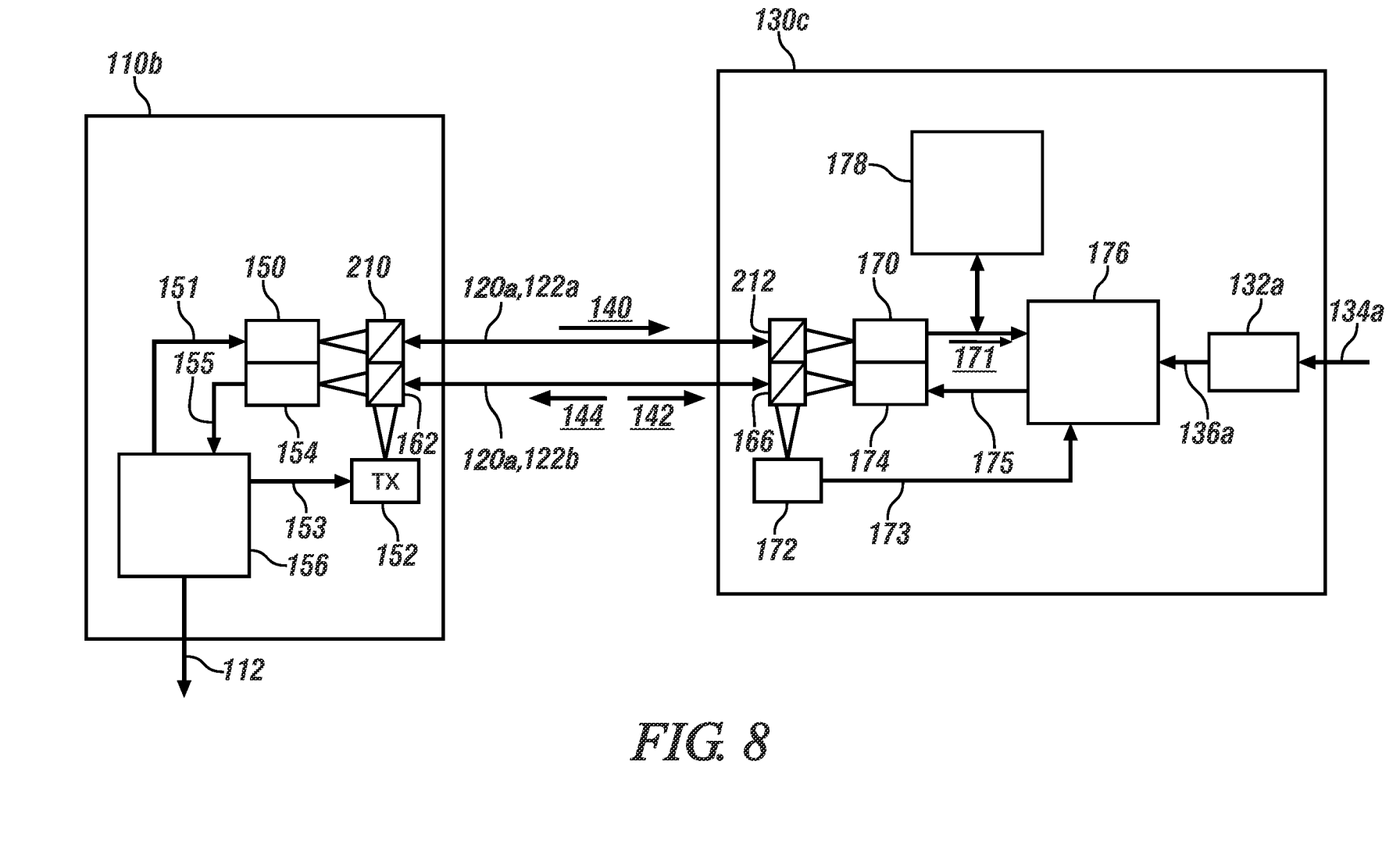
FIG. 8 is a schematic diagram of the electronic control unit, a fiber optical cable, and another sensor unit in accordance with one or more exemplary embodiments.

Referring to FIG. 8, a schematic diagram of an example implementation of an electronic control unit 110b, a fiber optical cable 120a, and a sensor unit 130c is shown in accordance with one or more exemplary embodiments. The electronic control unit 110b may be variation of the electronic control unit 110 and/or 110a. The fiber optical cable 120a may be a variation of the fiber optical cable 120. The sensor unit 130c may be a variation of the sensor unit 130, 130a and/or 130b.

The electronic control unit 110b generally includes the first optical transmitter 150, the second optical transmitter 152, the second optical receiver 154, the drive circuit 156, a first optical coupler 210, and the second beam splitter 162. The fiber optical cable 120a implements a multi-fiber cable that includes multiple (e.g., two) optical channels 122a-122b (or optical fibers). The sensor unit 130c includes the first sensor 132a, the first beam splitter 166, a second optical coupler 212, the first optical receiver 172, the remote optical transmitter 174, the control circuit 176, and the energy storage device 178.

The first optical coupler 210 is operational to transfer the optical power signal 140 from the first optical transmitter 150 to a first optical channel 122a of the fiber optical cable 120a. The second optical coupler 212 is operational to transfer the optical power signal 140 from the first optical channel 122a to the first photovoltaic device 170. Therefore, the first optical channel 122a conveys the optical power signal 140 without the first optical communications signal 142 and the second optical communications signal 144. A second optical channel 122b of the fiber optical cable 120a is coupled between the second beam splitter 162 and the first beam splitter 166. Therefore, the second optical channel 122b carries the first optical communications signal 142 and the second optical communications signal 144 without the optical power signal 140.

Figure 9:
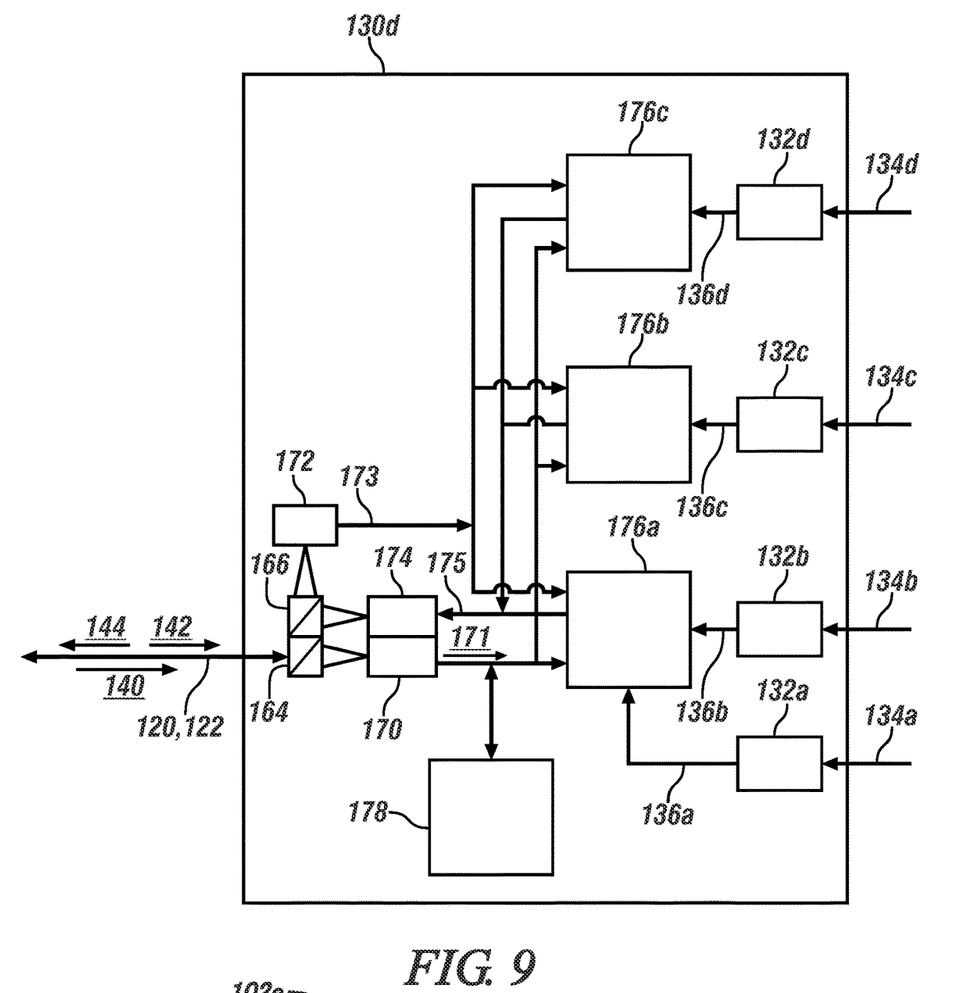
FIG. 9 is a schematic diagram of another sensor unit in accordance with one or more exemplary embodiments.

Referring to FIG. 9, a schematic diagram of an example implementation of another sensor unit 130d is shown in accordance with one or more exemplary embodiments. The sensor unit 130d is a variation of the sensor units 130, 130a, 130b and/or 130c.

The sensor unit 130d includes multiple sensor 132a-132d, the second optical multiplexer 164, the first beam splitter 166, the first optical receiver 172, the remote optical transmitter 174, multiple control circuits 176a-176c, and the energy storage device 178.

The electrical power 171 may be used to power the multiple control circuits 176a-176c and the multiple sensors 132a-132d. The first optical communications signal 142 may be directed to one or more control circuits 176a-176c. The second optical communications signal 144 may carry the measured parameters 134a-134d from the sensor 132a-132d. In various embodiments, some control circuits (e.g., 176a) may be connected to multiple sensors (e.g., the first sensor 132a that measures the first parameter 134a and a second sensor 132b that measures a second parameter 134b). Each control circuit 176a-176c may be encoded with an individual "signature" that enables entire packets of information to be distinguished in the second optical communications signal 144 at the electronic control unit 110. The electronic control unit 110 is operational to generate electrical sensed signals for the corresponding parameters 134a-134d. For example, the first electrical sensed signal 155 conveys the first parameter 134a, a second electrical sensed signal conveys the second parameter 134b, and so on.

Figure 10:
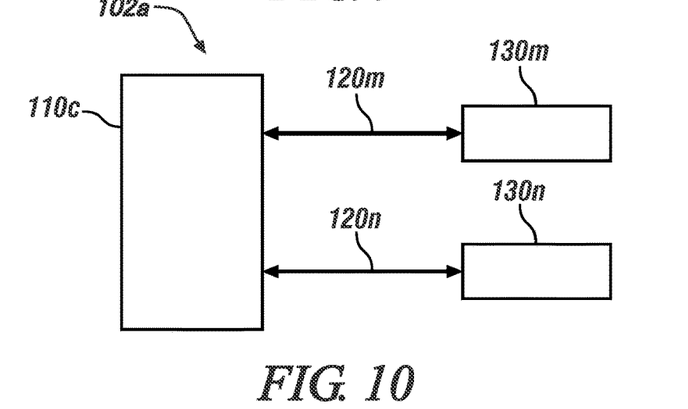
FIG. 10 is a schematic diagram of another system in accordance with one or more exemplary embodiments.

Referring to FIG. 10, a schematic diagram of an example implementation of another system 102a is shown in accordance with one or more exemplary embodiments. The automobile 100 may include a system 102a. The system 102a may be a variation of the system 102. The system 102a generally includes an electronic control unit 110c, multiple fiber optical cables 120m-120n, and multiple respective sensor units 130m-130n. The electronic control unit 110c may be a variation of the electronic control units 110, 110a and/or 110b. The sensor units 130m-130n may be variations of the sensor units 130a, 130b, 130c and/or 130d. The fiber optical cable 120m may be referred to as the first fiber optical cable 120m. The fiber optical cable 120n may be referred to as a second fiber optical cable 120n In various embodiments, the first optical transmitter 150 of the electronic control unit 110c may generate sufficient optical power in the multiple optical power signals 140 transmitted to the sensor units 130m-130n. In some embodiments, multiple first optical transmitters 150 may be implemented to generate the multiple optical power signals 140.

Figure 11:
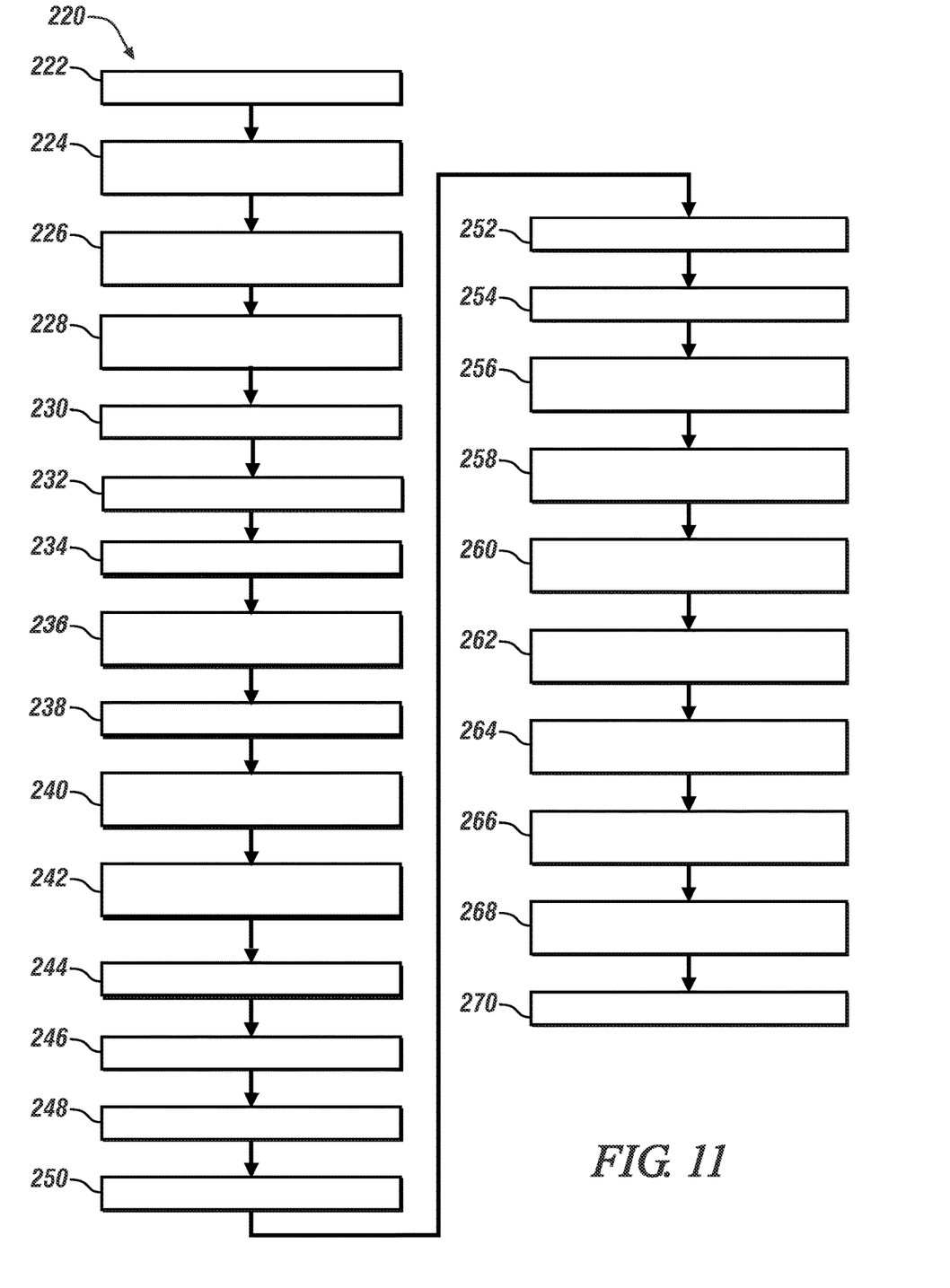
FIG. 11 is flow diagram of a method for intra-automobile communications in accordance with one or more exemplary embodiments.

Referring to FIG. 11, a flow diagram of an example method 220 for intra-automobile communications is shown in accordance with one or more exemplary embodiments. The method 220 (or process) may be implemented by the system 102/102a. The method 220 generally includes steps 222 to 270, as shown. The sequence of steps is shown as a representative example. Other step orders may be implemented to meet the criteria of a particular application.

In the step 222, the electronic control unit 110 generates the optical power signal 140. The optical power signal 140 is transmitted into the fiber optical cable 120 in the step 224. The fiber optical cable 120 transports the optical power signal 140 to the sensor unit 130 in the step 226 to power up the circuitry of the sensor unit 130 before the first optical communications signal 142 is transmitted. The optical power signal 140 is converted in the step 228 into the electrical power 171 with the first photovoltaic device 170. The electrical power 171 charges the energy storage device 178 in the step 230. The circuitry (e.g., the control circuit 176 and the first sensor 132a) are powered by the electrical power 171 in the step 232.

In embodiments where the optical power signal 140 is generated by the first optical transmitter 150 and the first optical communications signal 142 is generated by the second optical transmitter 152, the drive circuit 156 modulates the data control signal 153 and presents the data control signal 153 to the second optical transmitter 152 in the step 234. The second optical transmitter 152 generates the first optical communications signal 142 in the step 236. The optical power signal 140 and the first optical communications signal 142 are optically multiplex in the second optical multiplexer 164 of the electronic control unit 110 in the step 238.

In embodiments where the optical power signal 140 and the first optical communications signal 142 are generated by the first optical transmitter 150, the drive circuit 156 may generate the modulation signal 151a in the step 234. The first optical transmitter 150 may continue to generate the optical power signal 140 and generate a superimposed first optical communications signal 142 in response to the modulation signal in the step 240.

In the step 242, the optical power signal 140 and the first optical communications signal 142 are transported in a single channel (e.g., one optical fiber 122) of the fiber optical cable 120 to the sensor unit 130. At the sensor unit 130, the optical power signal and the first optical communications signal are demultiplexed from the single channel of the fiber optical cable 120 in the step 244.

In the step 246, the first optical receiver 172 converts the first optical communications signal 142 into the electrical control signal 173. The electrical control signal 173 is transferred to and received by the control circuit 176 in the step 248. In the step 250, the first sensor 132a measures the first parameter 134a related to the automobile 100 based on the electrical control signal 173 and using the electrical power 171 converted from the optical power signal 140.

Where implemented, the second parameter 134b related to the automobile 100 is measured with the second sensor 132b based on the electrical control signal 173 and using the electrical power 171 converted from the optical power signal 140 in the step 252.

In the step 254, the first sensor 132a generates the first sensed parameter signal 136a by measuring the first parameter 134a. Where implemented, the second sensor 132b generates a second sensed parameter signal 136b by measuring the second parameter 134b in the step 256. The other sensors 132c-132d may also generate corresponding sensed parameter signals 136c-136d. The electrical modulated signal 175 is generated in the step 258 based on the sensed parameter signals 136a-136d and the electrical control signal 173.

In the step 260, the remote optical transmitter 174 generates the second optical communications signal 144 in response to the electrical modulated signal 175. The second optical communications signal 144 generally conveys the parameters 134a-134d as measured. The second optical communications signal 144 is optically multiplexed into the single channel of the fiber optical cable 120 in the step 262. The fiber optical cable 120 transports the second optical communications signal 144 in the step 264 from the sensor unit 130 to the electronic control unit 110.

In the step 266, the second optical communications signal 144 is optically demultiplexed from the single channel of the fiber optical cable 120. The second optical communications signal 144 is converted into the first sensed parameter signal 136a and the second sensed parameter signal 136b in the step 268. The first sensed parameter signal 136a conveys the first parameter 134a as measured. The second sensed parameter signal 136b conveys the second parameter 134b as measured. In the step 270, the electronic control unit 110 takes action based on the first parameter 134a as measured and/or the second parameter 134b as measured. In various embodiments, the action may be the generation and presentation of the action signal 112.

Various embodiments of the system 102 generally allow for an externally isolated communications that is not sensitive to electromagnetic interference/radio-frequency interference (EMI/RFI). Since the system 102 is operated over fiber, there may be a reduce an amount of weight in the automobile 100 compared to wired communications and wired power distribution. Fiber connectivity is also simple and easy to maintain. Various optical communication protocols enable data rates/bandwidths potentially higher than current architectures. The higher data rates/bandwidths are particularly advantageous considering that future automobiles will have more sensors generating more data and the collected data will involve real time processing.

In various embodiments, a single communication fiber may support multiple sensor units. Power and communication are transmitted and received via optical fiber to independent modules distributed throughout the automobile 100. Power may be transmitted via a single multi-mode cable to charge a battery or power supply that operates the sensor units and other electrical modules. In various embodiments, the optical power is transmitted through multiple fibers coupled to a single source, or multiple sources, depending upon the power available at the source and the power consumed at each sensor unit. Power and communication information are transmitted over the same fiber in embodiments where the light source is modulated to create the digital signal. Communication between a proximal side and multiple distal sides of the system 102 may be made with a single laser source located at either the proximal end or the distal ends where the alternate end has a reflective device 180 (controlled by voltage) that may be modulated to allow digital communication over the fiber optical cable 120. In various embodiments, the reflective device 180 is controllable based upon a reflective coating or filter that may modulate the transmitted signal, whereby the modulation is understood to represent a digital 1 or 0 that forms the digital word that is being communicated. In some embodiments, the reflective device 180 may be a liquid crystal based optical switch that, via an applied voltage, changes a polarization state of the liquid crystal. When used in conjunction with a linear polarizer, the light is either transmitted or not, depending upon the liquid crystal voltage state. Communication is made with each independent sensor unit via the same power fiber or an independent fiber. Optical signal isolation may be wavelength dependent. Timing of the power pulses generally precede the communication pulses to power up the battery or power supply that drives the communication channel of the sensor units.

Embodiments of the systems and methods provide transporting optical power and optical communications signals over a fiber optical cable between an electronic control unit and a sensor unit. The optical power may be converted into electrical power that drives the sensor unit. The optical power and the optical communications signals effectuate solutions for power and data distribution inside an automobile that is light weight, immune to EMI/RFI interference, and is easy to maintain.

Numerical values of parameters (e.g., of quantities or conditions) in this specification, including the appended claims, are to be understood as being modified in instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as separate embodiments.

While the best modes for carrying out the disclosure have been described in detail, those familiar with the art to which this disclosure relates will recognize various alternative designs and embodiments for practicing the disclosure within the scope of the appended claims.

What is claimed is:

1. An automobile comprising:
an electronic control unit operational to generate an optical power signal and a first optical communications signal;
at least one fiber optical cable coupled to the electronic control unit and operational to transport the optical power signal and the first optical communications signal; and
a sensor unit located remote from the electronic control unit and coupled to the at least one fiber optical cable, wherein the sensor unit is operational to:
convert the optical power signal into an electrical power;
convert the first optical communications signal into an electrical control signal;
measure a first parameter related to the automobile with a first sensor based on the electrical control signal and using the electrical power converted from the optical power signal; and
generate a second optical communications signal that conveys the first parameter as measured, wherein:
the at least one fiber optical is further operational to transport the second optical communications signal from the sensor unit to the electronic control unit; and
the electronic control unit is further operational to:
convert the second optical communications signal into a first electrical sensed signal that conveys the first parameter as measured; and
take an action based on the first parameter in the first electrical sensed signal.

2. The automobile according to claim 1, wherein the sensor unit comprises:
a first photovoltaic device operational to convert the optical power signal into the electrical power;
a first optical receiver operational to convert the first optical communications signal into the electrical control signal; and
a control circuit powered by the electrical power, coupled to the first sensor, and operational to receive the electrical control signal.

3. The automobile according to claim 2, wherein:
the first sensor is operational to generate a first detection signal by measuring the first parameter;
the control circuit is further operational to generate an electrical modulated signal based on the first detection signal and the electrical control signal; and
the sensor unit includes a remote optical transmitter coupled to the control circuit and operational to generate the second optical communications signal in response to the electrical modulated signal.

4. The automobile according to claim 3, wherein:
the sensor unit is further operational to:
measure a second parameter related to the automobile with a second sensor based on the electrical control signal and using the electrical power converted from the optical power signal; and
generate the second optical communications signal to convey the first parameter as measured and the second parameter as measured; and
the electronic control unit is further operational to convert the second optical communications signal into the first electrical sensed signal that conveys the first parameter as measured, and a second electrical sensed signal that conveys the second parameter as measured.

5. The automobile according to claim 1, wherein:
the electronic control unit includes a first optical multiplexer operational to multiplex the optical power signal and the first optical communications signal into a single channel of the at least one fiber optical cable; and
the sensor unit includes a first beam splitter operational to demultiplex the optical power signal and the first optical communications signal from the single channel of the at least one fiber optical cable.

6. The automobile according to claim 5, wherein:
the sensor unit includes a second optical multiplexer operational to multiplex the second optical communications signal into the single channel of the at least one fiber optical cable; and
the electronic control unit includes a second beam splitter operational to demultiplex the second optical communications signal from the single channel of the at least one fiber optical cable.

7. The automobile according to claim 1, wherein the electronic control unit comprises:
- a drive circuit operational to generate a power drive signal and a data control signal;
- a first optical transmitter coupled to the drive circuit and operational to generate the optical power signal in response to the power drive signal; and
- a second optical transmitter coupled to the drive circuit and operational to generate the first optical communications signal in response to the data control signal.

8. The automobile according to claim 1, wherein the electronic control unit comprises:
- a drive circuit operational to generate a modulation signal by multiplexing a power drive signal and a data control signal; and
- a single optical transmitter coupled to the drive circuit and operational to generate the optical power signal and the first optical communications signal in response to the modulation signal.

9. The automobile according to claim 1, wherein
- the at least one fiber optical cable is a multi-fiber cable having at least a first optical channel and a second optical channel,
- the first optical channel is operational to convey the optical power signal; and
- the second optical channel is operational to convey the first optical communications signal and the second optical communications signal.

10. The automobile according to claim 1, wherein:
- the at least one fiber optical cable includes a first fiber optical cable and a second fiber optical cable, wherein the first fiber optical cable is separate from the second fiber optical cable;
- the first fiber optical cable is operational to convey the optical power signal; and
- the second fiber optical cable is operational to convey the first optical communications signal and the second optical communications signal.

11. The automobile according to claim 1, further comprising:
- a first optical transmitter coupled to one end of the at least one fiber optical cable and operational to generate an optical carrier signal that conveys one of the electrical control signal and the first parameter; and
- a reflective device coupled to an opposite end of the at least one fiber optical cable and operational to reflect the optical carrier signal to convey an opposite one of the electrical control signal and the first parameter.

12. A method for intra-automobile power and communications via fiber comprising:
- generating an optical power signal in an electronic control unit of an automobile;
- generating a first optical communications signal in the electronic control unit;
- transporting the optical power signal and the first optical communications signal in at least one fiber optical cable to a sensor unit of the automobile, wherein the sensor unit is remote from the electronic control unit;
- converting the optical power signal into an electrical power in the sensor unit;
- converting the first optical communications signal into an electrical control signal in the sensor unit;
- measuring a first parameter related to the automobile with a first sensor of the sensor unit based on the electrical control signal and using the electrical power converted from the optical power signal;
- generating a second optical communications signal in the sensor unit, wherein the second optical communications signal conveys the first parameter as measured;
- transporting the second optical communications signal in the at least one fiber optical cable from the sensor unit to the electronic control unit;
- converting the second optical communications signal into a first electrical sensed signal in the electronic control unit, wherein the first electrical sensed signal conveys the first parameter as measured; and
- taking an action in the electronic control unit based on the first parameter in the first electrical sensed signal.

13. The method according to claim 12, further comprising:
- converting the optical power signal into the electrical power with a first photovoltaic device;
- converting the first optical communications signal into the electrical control signal with a first optical receiver; and
- receiving the electrical control signal at a control circuit that is powered by the electrical power.

14. The method according to claim 13, further comprising:
- generating a first detection signal by measuring the first parameter with the first sensor;
- generating an electrical modulated signal based on the first detection signal and the electrical control signal; and
- generating the second optical communications signal in response to the electrical modulated signal.

15. The method according to claim 14, further comprising:
- measuring a second parameter related to the automobile with a second sensor based on the electrical control signal and using the electrical power converted from the optical power signal;
- generating the second optical communications signal to convey the first parameter as measured and the second parameter as measured; and
- converting the second optical communications signal into the first electrical sensed signal that conveys the first parameter as measured, and a second electrical sensed signal that conveys the second parameter as measured.

16. The method according to claim 12, further comprising:
- multiplexing optically in the electronic control unit the optical power signal and the first optical communications signal into a single channel of the at least one fiber optical cable; and
- demultiplexing optically in the sensor unit the optical power signal and the first optical communications signal from the single channel of the at least one fiber optical cable.

17. The method according to claim 16, further comprising:
- multiplexing optically in the sensor unit the second optical communications signal into the single channel of the at least one fiber optical cable; and
- demultiplexing optically in the electronic control unit the second optical communications signal from the single channel of the at least one fiber optical cable.

18. The method according to claim 12, further comprising:
- generating a modulation signal by multiplexing a power drive signal and a data control signal in the electronic control unit; and generating the optical power signal and the first optical communications signal in response to the modulation signal.

19. The method according to claim 12, further comprising:
transmitting the optical power signal before transmitting the first optical communications signal.

20. An automobile comprising:
an electronic control unit operational to generate an optical power signal and a first optical communications signal;
at least one fiber optical cable coupled to the electronic control unit and operational to transport the optical power signal and the first optical communications signal; and
a sensor unit remote from the electronic control unit, coupled to the at least one fiber optical cable, and having at least a first sensor and a second sensor, wherein the sensor unit is operational to:
convert the optical power signal into an electrical power;
convert the first optical communications signal into an electrical control signal;
measure a first parameter related to the automobile with the first sensor based on the electrical control signal and using the electrical power converted from the optical power signal;
measure a second parameter related to the automobile with the second sensor based on the electrical control signal and using the electrical power converted from the optical power signal; and
generate a second optical communications signal that conveys the first parameter as measured and the second parameter as measured, wherein:
the at least one fiber optical is further operational to transport the second optical communications signal from the sensor unit to the electronic control unit; and
the electronic control unit is further operational to:
convert the second optical communications signal into a first electrical sensed signal that conveys the first parameter as measured and a second electrical sensed signal that conveys the second parameter in the first electrical sensed signal.

* * * * *